United States Patent
Pauly

Patent Number: 6,075,322
Date of Patent: *Jun. 13, 2000

[54] SELF-CONTAINED ELECTROLUMINESCENT MARKER AND LIGHT

[76] Inventor: Kristin C. Pauly, 1117 Peutz Valley Rd., Alpine, Calif. 91901

[*] Notice: This patent is subject to a terminal disclaimer.

[21] Appl. No.: 09/289,763

[22] Filed: Apr. 12, 1999

Related U.S. Application Data

[63] Continuation-in-part of application No. 08/963,666, Nov. 3, 1997, Pat. No. 5,929,571.

[51] Int. Cl.[7] .................................................. H05B 37/00
[52] U.S. Cl. ..................... 315/127; 315/185.5; 315/86; 362/84; 362/206; 362/802
[58] Field of Search ..................................... 315/127, 119, 315/74, 185.5, 86, 169.3; 362/84, 95, 155, 154, 157, 202–206, 208, 252, 276, 802, 806

[56] References Cited

U.S. PATENT DOCUMENTS

| | | | |
|---|---|---|---|
| 5,161,879 | 11/1992 | McDermott | 362/206 |
| 5,313,141 | 5/1994 | Kimball | 315/169.3 |
| 5,563,472 | 10/1996 | Cassidy | 315/119 |
| 5,676,451 | 10/1997 | Tabanera | 362/156 |
| 5,711,594 | 1/1998 | Hay | 362/84 |
| 5,713,655 | 2/1998 | Blackman | 362/95 |
| 5,895,112 | 4/1999 | Olivit et al. | 362/189 |

*Primary Examiner*—Haissa Philogene
*Attorney, Agent, or Firm*—Henri J. A. Charmasson; John D. Buchaca

[57] ABSTRACT

A compact, rugged, long-lasting, battery-powered light fixture suitable for use as an emergency signal, marker, or flashlight has a lighting element made from a phosphorous-based luminescent film section curled into an arcuate shape and packaged within a transparent tubular enclosure. The AC power supply and batteries are held in the center of the enclosure inside the lighting element.

9 Claims, 1 Drawing Sheet

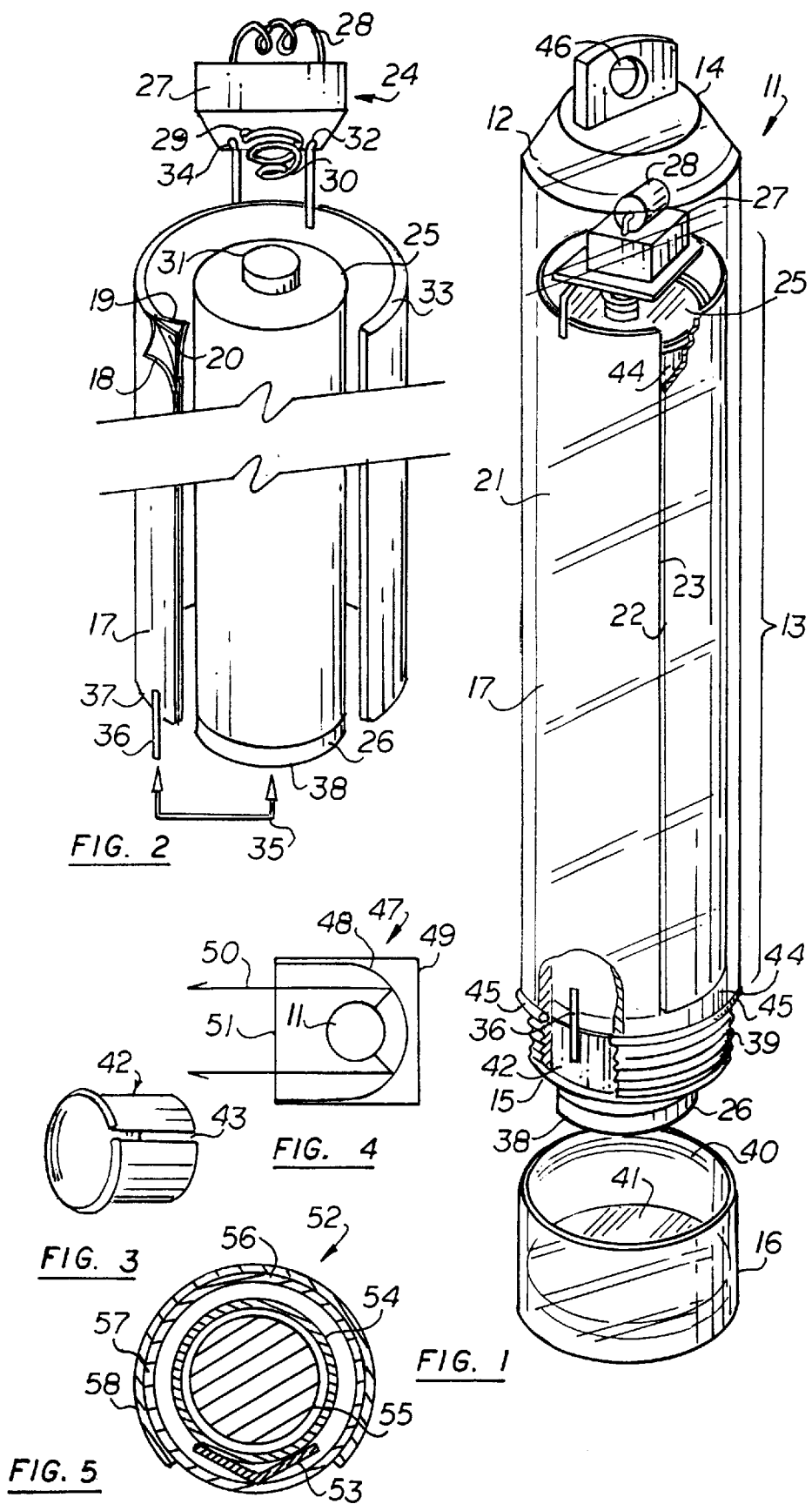

SELF-CONTAINED ELECTROLUMINESCENT MARKER AND LIGHT

This Application is a Continuation-in-part of application Ser. No. 08/963,666 filed Nov. 3, 1997 now U.S. Pat. No. 5,929,571.

FIELD OF THE INVENTION

This invention relates to emergency lights, markers and flashlights and more specifically to light fixtures intended for long use under harsh conditions.

BACKGROUND OF THE INVENTION

The most common type of emergency light and markers consist of a short stick containing chemicals which, when they are put in contact with each other, emit light. Those chemical light sticks are activated by bending their enclosure. The bending breaks a septum separating the chemicals allowing their mixing. This type of emergency light and markers have a very short life and cannot be reused. Their disposal can create harmful environmental hazards. Accordingly, there is a need for a more durable type of light fixture that can be used not only as emergency lights and markers but also as a portable flashlight.

Most flashlights do not have an intensity adjustment. In some situations where only a very limited amount of light is called for, the lens of the flashlight must be covered with a filter or a semi-opaque film in order to dim its output. Accordingly, there is a need for a type of flashlight with a limited amount of power which is sufficient to read by but remains undetectable from a distance.

SUMMARY OF THE INVENTION

The principal and secondary objects of this invention are to provide a compact, rugged, long lasting, and reusable source of light for use as a marker, emergency signal or flashlight.

It is also an object of the invention to provide a convenient replacement for chemical light sticks.

These and other valuable objects are achieved by forming an arcuate light element out of a capacitive type luminescent film and packaging it in a transparent tubular enclosure along with an AC driver and a set of household batteries as a compact, waterproof and shockproof device.

BRIEF DESCRIPTION OF THE DRAWING

FIG. 1 is a perspective view of the light fixture according to the invention with the bottom cap removed;

FIG. 2 is a exploded diagram of the electrical system;

FIG. 3 is a perspective view of the contact sleeve;

FIG. 4 is a diagrammatical illustration of an alternate embodiment of the light fixture; and FIG. 5 is a cross-sectional schematical view of an alternate embodiment of the invention.

DESCRIPTION OF THE PREFERRED EMBODIMENT OF THE INVENTION

Referring now to the drawing, there is shown in FIG. 1 a light fixture 11 packaged in a tubular housing 12 of which at least the median section 13 is transparent. The housing has a closed top end 14 and an open bottom end 15 that can be closed by applying to it a cap 16. An arcuate lighting element 17 can be seen through the median transparent area 13 of the housing.

As shown in the diagram of FIG. 2, the lighting element 17 is made of a section of bendable, electroluminescent film of a capacitive type. The film comprises a top sheet electrode 18 made of transparent material, a back sheet electrode 19, and, sandwiched in between, a dielectric layer 20 including phosphorous particles. When an AC power source is applied to the electrodes 18, 19 phosphorous particles within the dielectric 20 emits light visible through the transparent front electrode 18. This type of luminescent film is commonly used in the back-lighting of watch and clock dials as well as the control gauges and dials of automobiles. The film used in this embodiment is commercially available under the brand name DUREL 3 R from Durel Corporation of Chandler, Ariz. The film 19 is bent into a tube 21 until its right side edge 22 lies adjacent to the left side edge 23 with the front transparent sheet electrode facing the outside. The bent tube 21 is inserted into the tubular enclosure with the transparent electrode 18 in contact with the inside wall of the enclosure.

The film is energized by a power supply comprising an AC power source 24 and a DC power source, namely a pair of series connected AA size batteries 25, 26. The AC power source 24 consists essentially of a pumping-inductor based inverter microcircuit device 27 commercially available under serial number D340B also from Durel Corporation. This type of inverter is disclosed in U.S. Pat. No. 5,313,141 which patent is incorporated in this specification by this reference. The microcircuit device has terminals for connection to a coil 28, a DC input terminal 29 tied to a coil spring 30 for contact with the positive pole 31 of one of the batteries 25. The microcircuit device 27 has also a AC output terminal 32, in electrical contact with the second sheet electrode 19 along the top edge 33 of the film. A neutral terminal 34 of the microcircuit device 27 is also connected along the top edge 33 of the film to the transparent electrode 18. It will be understood that when the coil spring 30 is in contact with the positive pole 31 of the battery 25 and the negative pole of the upper battery 25 is in contact with the positive pole of the lower battery 26 (not shown in the drawing) the light circuit is energized by providing a connection 35 between a transparent electrode contact point 36 at the bottom edge 37 of the film with the negative pole 38 of battery 26. In the light fixture, this connection 35 is provided when the cap 16 is applied to the open end 15 of the housing 14 and turned clockwise along a set of cooperating threads 39, 40 along the outer lower edge of the housing and the inner wall of the cap 16 respectively, until a metal plate 41 bonded to the inside bottom of the cap 16 contacts the negative pole 38 of battery 26 and a metal sleeve 42. The sleeve lines the lower inner edge of the enclosure 14 about its bottom opening 15 while and at the same time touches the contact point 36 at the bottom edge of the film as seen through the cutout in the lower part of the housing shown in FIG. 1. The sleeve 42 is preferably made of a slightly resilient material such as a copper alloy and is provided with a side slit 43 so that the sleeve must be squeezed during insertion into the bottom opening 15. Once released, the resilient action of the sleeve positively pinches the contact point 36 against the inside wall of the enclosure.

In order to protect the inner wall of the film against abrasion during the insertion of the batteries, a tubular sleeve 44 is mounted coaxially within the enclosure between the batteries and the film. A resilient O-ring 45 is mounted at the base of the tread 39 to provide a waterproof seal. The thickness of the O-ring and its resiliency are selected so that when the cap comes into light contact with the O-ring, contact between the conductive plate 41 and the sleeve 42 is not achieved. However, as the cap is screwed further, the O-ring collapses and allows the plate 41 to contact the sleeve 42.

A eyelet 46 is provided at the top end of the enclosure for attachment to another structure.

In this preferred embodiment of the invention, the film 17 of about 4.84×10.26 centimeters (1.9×4 inches) produced a green light output of about 8.5 candela/m² (2.5 footlambert) for a duration of over 100 hours per battery set.

It should be understood that the shapes and dimensions of the enclosure and the film could be modified to meet requirements of various applications. The electrical circuit closure could also be achieved by other switching means. In addition, films producing various different wavelength light are also available from Durel Corporation and are easily adapted to the present embodiment.

Although the preferred approach involves rolling up a substantially flat film to form a tubular lighting element, it is possible to fabricate a tubular element thereby eliminating side edges 22, 23, albeit presently at a higher cost.

Although the preferred approach uses the D340B microcircuit inverter, other AC microcircuit power sources are available. These devices may require additional wiring to properly tie its terminals to the various components of the fixture in a manner apparent to those skilled in the art.

FIG. 4 illustrates an alternate embodiment 47 of the light fixture in which the light element 11 is positioned within a parabolic reflector 48 held inside an enclosure 49. The light emitting from back, top and bottom sides of the element 11 is focused in a parallel ray beam 50 through the lens 51 on the face of the enclosure.

In an alternate embodiment 52 of the invention illustrated in FIG. 5, the lighting element 53 is constituted by a strip of luminescent film bent into a triangular or arcuate shape and mounted against, and partially surrounding, the tubular sleeve 54 made of paper or a similarly light material into which the batteries 55 are inserted. The part 56 of the tubular housing 57 which is not backed by the lighting element 53 is either made opaque or covered with an opaque masking layer 58 of material.

The lighting element may extend over an arc ranging from approximately 45 to 180 degrees. Such a reduced size element will consume a lesser amount of power. For instance, a luminescent film of about 1.25×10.26 centimeters (0.5×4 inches) would produce a light output of about 2.1 candle power (0.625 footlambent) for a duration of over 400 hours when powered with a pair of AA size batteries.

Apart from the size and configuration of the lighting element, this alternate embodiment of the invention is made and operates exactly as the other embodiment.

While the preferred embodiments of the invention have been described, modifications can be made and other embodiments may be devised without departing from the spirit of the invention and the scope of the appended claims.

What is claimed is:

1. A light fixture which comprises:

a tubular housing having a transparent midsection;

a bendable electroluminescent film capable of emitting light when connected to an AC power source;

said film having a top, bottom, right and left edges, and being inserted within said housing;

a power source held, partially surrounded by said film, within said housing; and means for releasably applying said power source to said film.

2. The light fixture of claim 1, wherein:

said tubular housing has a closed top end and a sealable bottom end;

said electroluminescent film is of a capacitive type, and includes a front, transparent first sheet electrode, a rear, second sheet electrode, and a dielectric layer of light-emitting compound held between said sheet electrodes, a first contact point at said top edge connected to said first sheet electrode, a second contact point at said top edge connected to said second sheet electrode, and a third contact point at said bottom edge connected to the second sheet electrode;

said power supply comprises an AC power source having a neutral terminal, a positive DC input terminal and an AC output terminal;

said AC power source being located in said housing proximate said top end;

said first contact point being in electrical contact with said AC output terminal, and said second contact being in electrical contact with said neutral terminal;

said power supply further comprising at least one battery within said enclosure, said battery having a first pole in contact with said DC input terminal, and a second pole; and said means for applying comprising switch means for releasably connecting said second pole to said third contact point.

3. The light fixture of claim 2 wherein said housing further comprises:

a cap removably applicable to said bottom end; and said switch means comprises an electro-conductive plate mounted on an inside surface of said cap, said plate being shaped and dimensioned to come in electrical contact with said second pole and with said third contact point when said cap is fully applied to said bottom end.

4. The light fixture of claim 2, which further comprises means for securing said fixture to another structure.

5. The light fixture of claim 4, wherein said means for securing comprise an eyelet proximate said top end.

6. The light fixture of claim 2, which further comprises a tubular sleeve mounted coaxially in between said film and said battery.

7. The light fixture of claim 3, wherein said switch means comprises cooperating sets of threads at the bottom end of the enclosure and on said cap.

8. The light fixture of claim 7, wherein said switch means further comprises an electro-conductive circular sleeve lining an inside surface of said tubular housing about said bottom end and contacting said third contact point at said bottom edge of the film.

9. The light fixture of claim 1, wherein said film is bent into an arc ranging from 45 to 180 degrees.

* * * * *